(12) United States Patent
Michel et al.

(10) Patent No.: US 8,977,281 B2
(45) Date of Patent: Mar. 10, 2015

(54) FILTER ARRANGEMENT DEPENDENT ON OCCUPATION OF AN ADJACENT BAND

(75) Inventors: Jürgen Michel, München (DE); Bernhard Raaf, Neuried (DE)

(73) Assignee: Siemens Aktiengesellschaft, Munich (DE)

( * ) Notice: Subject to any disclaimer, the term of this patent is extended or adjusted under 35 U.S.C. 154(b) by 767 days.

(21) Appl. No.: 12/309,484

(22) PCT Filed: Jul. 11, 2007

(86) PCT No.: PCT/EP2007/057067
§ 371 (c)(1),
(2), (4) Date: Jan. 21, 2009

(87) PCT Pub. No.: WO2008/009593
PCT Pub. Date: Jan. 24, 2008

(65) Prior Publication Data
US 2009/0325589 A1 Dec. 31, 2009

(30) Foreign Application Priority Data
Jul. 18, 2006 (EP) .................................... 06014921

(51) Int. Cl.
*H04W 72/00* (2009.01)
*H04L 5/02* (2006.01)
*H04L 5/06* (2006.01)
*H04L 27/26* (2006.01)

(52) U.S. Cl.
CPC *H04L 5/023* (2013.01); *H04L 5/06* (2013.01); *H04L 27/2614* (2013.01); *H04L 27/2626* (2013.01)

USPC .......... 455/452.2; 455/509; 455/561; 455/91; 370/335; 375/260

(58) Field of Classification Search
USPC ................. 455/452.2, 509, 561, 91; 370/335; 375/260
See application file for complete search history.

(56) References Cited

U.S. PATENT DOCUMENTS

| | | | |
|---|---|---|---|
| 5,357,502 A | 10/1994 | Castelain et al. | |
| 6,275,523 B1 * | 8/2001 | Chen et al. ..................... | 375/226 |
| 2002/0177446 A1 * | 11/2002 | Bugeja et al. ................. | 455/450 |
| 2005/0130665 A1 * | 6/2005 | Laroia et al. .................. | 455/450 |
| 2005/0259628 A1 | 11/2005 | Bolinth et al. | |
| 2006/0018393 A1 * | 1/2006 | Gore et al. ..................... | 375/260 |
| 2007/0110003 A1 * | 5/2007 | Tujkovic et al. .............. | 370/335 |

FOREIGN PATENT DOCUMENTS

| | | |
|---|---|---|
| EP | 0 952 696 | 10/1999 |
| EP | 1 533 910 | 5/2005 |

(Continued)

OTHER PUBLICATIONS

3GPP TS 25.101 V6.17.0, May 2008.

(Continued)

*Primary Examiner* — Shahriar Behnamian
(74) *Attorney, Agent, or Firm* — Staas & Halsey LLP

(57) ABSTRACT

In a method for communication by radio a frequency band that is subdivided into a plurality of subbands is used. Subbands are occupied by radio stations for sending signals. Before sending a signal, a radio station carries out a filtering operation by using a filter function and sends the signal on at least one subband. A parameter of the filter function depends on the occupation of at least one subband adjacent to the at least one subband.

18 Claims, 1 Drawing Sheet

(56) References Cited

FOREIGN PATENT DOCUMENTS

| GB | 2 404 533 | 2/2005 |
| JP | 2004-173153 A | 6/2004 |
| WO | 02/063843 | 8/2002 |
| WO | 03/015443 A1 | 2/2003 |
| WO | 2006/046307 A1 | 5/2006 |
| WO | 2006/092852 A1 | 9/2006 |

OTHER PUBLICATIONS

3GPP TS 25.101 V7.4.0, Jun. 2006.

3GPP TSG-RAN WG1 #44 R1-060470 Denver, USA; Feb. 13-17, 2006, Qualcomm Europe: "PAR Reduction through Frequency Domain Spectrum Shaping" pp. 1-9.
3GPP TSG-RAN WG1 #44 R1-060669 Denver, USA; Feb. 13-17, 2006, Siemens: "SC-FDMA PAPR Reduction" pp. 1-3.
3GPP TSG-RAN WG1 #44 R1-060318 Denver, USA Feb. 13-17, 2006, NTT DoCoMo: "Optimum Roll-off Factor for DFT-Spread OFDM Based SC-FDMA in Uplink" pp. 1-9.
Japanese Office Action submitted in German received Oct. 26, 2011 in corresponding Japanese Patent Application No. 2009-519933.
Notice of Allowance for related Korean Patent Application No. 10-2009-7003241, issued Jan. 28, 2014, 6 pages.

* cited by examiner

FILTER ARRANGEMENT DEPENDENT ON OCCUPATION OF AN ADJACENT BAND

CROSS REFERENCE TO RELATED APPLICATIONS

This application is based on and hereby claims priority to European Application No. EP06014921 filed on Jul. 18, 2006 and PCT Application No. PCT/EP2007/057067 filed on Jul. 11, 2007, the contents of which are hereby incorporated by reference.

BACKGROUND OF THE INVENTION

The invention relates to a method for communication by radio using a frequency band subdivided into a plurality of subbands.

In radio communication systems, communications such as voice information, image information, video information, SMS (Short Message Service), MMS (Multimedia Messaging Service) or other data are transmitted using electromagnetic waves across a radio interface between transmitting and receiving station. These stations can be various kinds of user stations or network-side installations such as repeaters, radio access points or base stations, depending on the specific implementation of the radio communication system. In a mobile communication system, at least some of the user stations are mobile stations. The electromagnetic waves are radiated using carrier frequencies which lie within in the frequency band intended for the particular system.

Such mobile communication systems are often implemented as cellular systems e.g. in accordance with the GSM (Global System for Mobile Communication) or UMTS (Universal Mobile Telecommunications System) standard, having a network infrastructure including of base stations, equipment for monitoring and controlling the base stations, and other network-side equipment. Another example are broadband networks with wireless access in accordance with IEEE 802.16, for example. Future mobile communication systems can be e.g. refinements of UMTS, known as LTE (Long Term Evolution), or fourth generation systems, and also ad-hoc networks. Aside from supralocal cellular hierarchical radio networks, there exist wireless local area networks (WLANs) with generally much more limited coverage. Examples of different standards for WLANs are HiperLAN, DECT, IEEE 802.11, Bluetooth and WATM.

In radio communication systems, access to the common transmission medium by user stations is controlled by multiple access methods/multiplex methods (MA). For these multiple accesses, the transmission medium can be shared between the user stations in the time domain (Time Division Multiple Access, TDMA), in the frequency domain (Frequency Division Multiple Access, FDMA), in the code domain (Code Division Multiple Access, CDMA) or in the space domain (Space Division Multiple Access, SDMA). Combinations of multiple access methods are also possible, e.g. a frequency domain access method can be combined with a code domain access method.

In order to maximize data transfer efficiency, the entire available frequency band can be split up into plurality of subbands (multicarrier method). The basic idea of multicarrier systems is to recast the initial problem of transmitting a broadband signal into one of transmitting a plurality of narrowband signals. One of the advantages of this approach is that it enables receiver complexity to be reduced. In addition, the splitting-up of the available bandwidth into a plurality of narrowband subbands allows much higher data transmission granularity in respect of the distribution of the data to be transmitted among the different subbands, i.e. the radio resources can be more finely distributed over the data to be transmitted or more specifically between the user stations. Particularly in the case of variable rate data transmission or bursty data traffic, the available bandwidth can be efficiently utilized by allocating a plurality of subbands to different user stations. One example of a multicarrier transmission method is OFDM (Orthogonal Frequency Division Multiplexing) in which timewise approximately rectangular pulse shapes are used for the subbands.

SUMMARY

One possible object is to present an efficient method for communication by radio in which a frequency band is subdivided into a plurality of subbands. A station for implementing the method will also be proposed.

The inventors propose a method for communication by radio, in which a frequency band is subdivided into a plurality of subbands. Subbands are adjacent if they are directly contiguous in the frequency domain, i.e. if no other subband is disposed between them. Subbands are used by user and base stations to transmit signals. Prior to transmitting a signal, a user station performs filtering using a filter function, and transmits the signal on at least one subband allocated to it by the base station, a parameter of the filter function being dependent on the occupancy of at least one subband adjacent to the at least one subband. The effect of this dependency can be, for example, that the value of the parameter is selected and used depending on the occupancy by at least one other user station, or that the parameter is used or not used depending on the occupancy. In addition to the dependency on the occupancy of the at least one adjacent subband, other dependencies may exist, e.g. dependency on the occupancy of another subband, particularly on the occupancy of a subband adjacent to the at least one adjacent subband.

The dependency of the filtering on the occupancy of at least one adjacent subband by another user station is advantageously used to reduce the interference between different transmitters' signals. Alternatively, the parameter can be dependent on the occupancy of the at least one sideband adjacent to the at least one sideband by the station. This procedure is particularly suitable for the case that the signal is transmitted in the downlink direction, i.e. from a base station to a user station. The occupancy-dependent filtering can in this case serve to reduce the interference between a transmitter's signals which are sent out to various receivers.

According to the proposed method, prior to carrying out filtering, the user station receives, from the base station, information concerning an allocation of the at least one subband to the user station and an allocation of the at least one adjacent subband to at least one other station. This information can be used by the user station to determine the parameters to be used. Allocation of a subband to a station means in this case that said subband is occupied by the particular station to which the allocation relates.

The filter used by the user station can be a filter in the time domain or in the frequency domain. Accordingly, the filter function can specify a curve shape plotted versus time or versus frequency. In this manner, the user station itself modifies and adapts the frequency allocation of the at least one subband depending on another user station's adjacent subband allocation. After the filtering, the user station transmits the signal. This transmission can take place using an individual subband, using a plurality of individual subbands, or using a plurality of adjacent subbands that are contiguous in the frequency domain, i.e. a block of subbands.

Prior to transmission of the signal, a decision is made regarding the filter function parameter to be used for filtering the signal to be transmitted. This decision and therefore the parameter depends on the occupancy of at least one subband adjacent to the at least one subband. In order to make the decision, it must therefore be checked whether or not the at least one adjacent subband is occupied. The checking and the decision making can be performed by the station or by another device which can communicate the occupancy/non-occupancy and/or the parameter to be used to the station. Various methods can be used to determine the state of occupancy of the at least one adjacent subband.

A subband is occupied if it is currently being used by a station to transmit a signal. In addition, occupancy of a subband can also be due to the fact that the subband is currently allocated to a station for transmitting signals, so that said station is authorized to use the subband for transmission, the term "currently" preferably referring to the instant or period of time of transmission of the signal by the station. In connection with determining the parameter to be used by the station, a subband is only deemed to be occupied if the occupancy is in a particular region surrounding the location of the station, e.g. in a radio cell in which the station is located.

In a development, the parameter determines the frequency domain filter bandwidth. In particular, the parameter can often be the roll-off factor designated α. The fact that the parameter determines the frequency domain filter bandwidth means that the frequency domain filter bandwidth can be varied by varying the parameter. It is possible that additional parameters exist which also determine the frequency domain filter bandwidth.

In an embodiment, if at least one adjacent subband is occupied, a lower frequency domain filter bandwidth is transmitted than in the case of non-occupancy. It is possible for e.g. two discrete values to be specified for the parameter, the value corresponding to the lower frequency domain filter bandwidth being used in the event of occupancy and the value corresponding to the larger frequency domain filter bandwidth being used in the event of non-occupancy.

It is particularly advantageous if, in the event of the at least one adjacent subband being occupied, a frequency domain filter bandwidth is determined by the parameter such that the signal is transmitted not using parts of the at least one adjacent subband. This means that when an adjacent subband is occupied, the signal does not extend into said adjacent subband, i.e. the signal is transmitted using the at least one subband, possibly extending into a different adjacent subband. It is also advantageous if, in the case of non-occupancy of the at least one adjacent subband, a frequency domain filter bandwidth is determined by the parameter such that the signal is transmitted using parts of the at least one adjacent subband. This means that when an adjacent subband is not occupied, the signal extends into said adjacent subband. If two adjacent subbands exist, for a first the procedure can be as described in the occupancy case and, for a second, as described in the non-occupancy case.

In another embodiment, the information relating to the allocation of the at least one adjacent subband to the at least one other station is jointly coded with information relating to the allocation of the at least one subband to the station. In this way, in order to determine the radio resources allocated to it, the station must also decode a radio resource allocation not relating to it.

According to a preferred development, because of the dependency of the parameter, the shape of the filter function at a frequency edge of the at least one subband differs from the shape of the filter function at another frequency edge of the at least one subband. If the at least one subband is an individual subband, this makes it possible for the shape of the filter function at the left-hand edge to be different from that at the right-hand edge of the individual subband. The same applies if the at least one subband is a plurality of adjacent coherent subbands, i.e. a block of subbands: it is possible for the shape of the filter function at the left-hand edge of the leftmost subband to be different from that at the right-hand edge of the rightmost subband. If the at least one subband is a plurality of individual subbands, one or more subbands may exist for which the shape at the left-hand and right-hand edge is the same, and/or one or more subbands for which the shape at the left-hand edge is different from the shape at the right-hand edge.

It is particularly advantageous if varying the parameter causes the ratio of the peak output power of the station to the average power of the station to be varied, thereby enabling the PAPR (peak to average power ratio) to be influenced by varying the parameter.

The station can be a user station. In this case signal transmission can be to a base station or directly to another user station. Alternatively, the station can be a base station, in which case signal transmission can be to a user station.

It is particularly advantageous for the filter to be implemented as a root raised cosine filter.

The proposed user station communicates by radio using a frequency band subdivided into a plurality of subbands. The user station has a receiver for receiving information from a base station regarding an allocation of at least one subband to the user station and an allocation of at least one adjacent subband to at least one other user station. The user station occupies the at least one allocated subband for transmitting signals and has a filter for performing filtering using a filter function prior to transmitting a signal. The filter uses a parameter of the filter function depending on the occupancy of at least one subband adjacent to the at least one subband allocated to the user station (UE) by the at least one other user station. The signal is transmitted on at least one subband.

The proposed base station communicates using a frequency band subdivided into a plurality of subbands, and has a transmitter for transmitting information from a base station concerning an allocation of at least one subband to a user station and an allocation of at least one adjacent subband to at least one other user station. The transmitter occupies allocated subbands for transmitting signals. A filter filters using a filter function prior to transmission of a signal on the at least one subband allocated to the user station. The filter uses a parameter of the filter function depending on the allocation of the at least one adjacent subband to the at least one other user station. The transmitter transmits the signal on the at least one subband allocated to the user station.

The stations are particularly suitable for implementing the proposed method, this also applying to the embodiments and developments.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
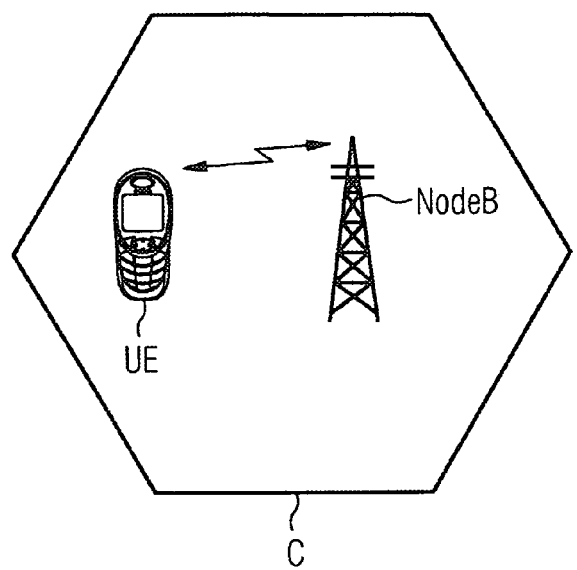
FIG. 1: shows part of a radio communication system.

Reference will now be made in detail to the preferred embodiments of the present invention, examples of which are illustrated in the accompanying drawings, wherein like reference numerals refer to like elements throughout.

The detail of a radio communication system illustrated in FIG. 1 shows the radio cell C of the base station NodeB. The base station NodeB communicates within its radio cell C with user stations, such as the user station UE shown in FIG. 1. The user station UE can be a mobile or fixed station, such as a mobile telephone or a computer. For reasons of clarity, FIG. 1 does not show other network infrastructure equipment to which the base station NodeB is connected, or any other radio cells and user stations present.

The proposed method is applicable to various types of radio communication systems, thus the base station NodeB can be e.g. a station in a cellular or local area system. As a concrete example, a system according to a development of UMTS, known as 3G LTE (3rd Generation Long Term Evolution) will be considered below.

Figure 2:
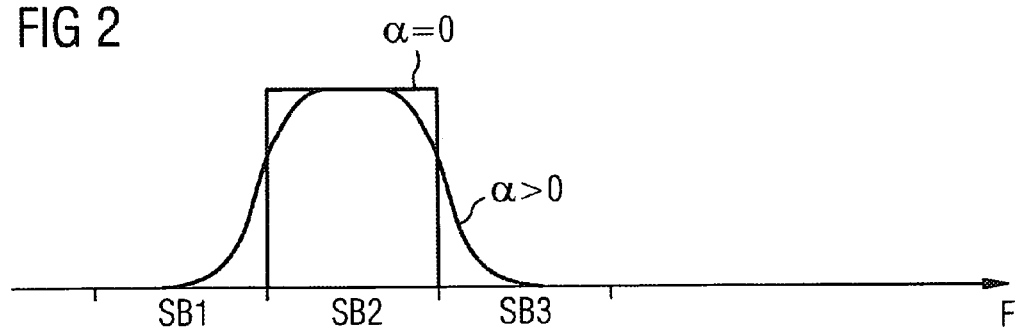
FIG. 2: shows various filter function curves.

The user station UE can communicate with the base station NodeB in the uplink direction, i.e. by the transmission of information from the user station UE to the base station NodeB, and/or in the downlink direction, i.e. by the transmission of information from the base station NodeB to the user station UE. The proposed method is applicable to both the uplink direction and the downlink direction. As a concrete example, communication between the user station UE and the base station NodeB in the uplink direction will now be considered. For this communication between the base station NodeB and the user station UE a frequency band subdivided into subbands is used. FIG. 2 shows part of this frequency band, comprising the subbands SB1, SB2 and SB3, the frequency F being plotted to the right. OFDMA or SC-FDMA (Single Carrier FDMA), for example, can be used for signal transmission.

A filter is used on the transmitter side. The term filter function will be used in the following to denote a function which determines the waveshape of radiated signal power versus frequency (pulse shaping or more specifically pulse shaping filter), i.e. the following description relates to the frequency domain. A Fourier transformation can of course be used to transform a frequency domain filter function into a time domain filter function, so that the comments made relating to the frequency domain are correspondingly applicable to the time domain.

It is particularly advantageous to use a root raised cosine (RRC) filter or a Kaiser filter, as described e.g. in Technical Specification 3GPP TS 25.101 (3rd Generation Partnership Project; Technical Specification Group Radio Access Network; User Equipment (UE) radio transmission and reception (FDD)), Section 6.8.1. These filters are generally designed with the aid of digital filters such as FIR (finite impulse response) filters. Using filters is appropriate, as their use enables the PAPR (peak to average power ratio) to be reduced. This PAPR reduction effect is explained e.g. in 3GPP TSG-RAN WG1 #44 R1-060470 Denver, USA Feb. 13-17, 2006, Qualcomm Europe: "PAR Reduction through Frequency Domain Spectrum Shaping"

3GPP TSG-RAN WG1 #44 R1-060669 Denver, USA Feb. 13-17, 2006, Siemens: "SC-FDMA PAPR Reduction"

3GPP TSG-RAN WG1 #44 R1-060318 Denver, USA Feb. 13-17, 2006, NTT DoCoMo: "Optimum Roll-off Factor for DFT-Spread OFDM Based SC-FDMA in Uplink".

The PAPR is the ratio of the peak output power of the user station UE to its average output power. This variable is particularly relevant to transmission in the uplink direction. For in the uplink direction the achievable data rate—or more specifically the range for a given data rate—is usually limited by the performance of the transmit amplifier. It is not the average power that is the limiting factor here, but the peak power. For the amplifier must be capable of producing a particular specified peak power. Therefore, the larger the PAPR, the lower the achievable average power. The PAPR can be reduced by selecting a suitable modulation method such as QPSK (quadrature phase shift keying).

The filter function can be matched by varying the roll-off factor $\alpha$. The roll-off factor $\alpha$ is a filter parameter and can be varied within the limits $0 \leq \alpha \leq 1$. The greater the roll-off factor $\alpha$, the wider the bandwidth of the filter. In practice a roll-of factor $\alpha$ of 0.2 to 0.5 is used. The roll-off factor $\alpha$ is explained e.g. in Technical Specification 3GPP TS 25.101 (3rd Generation Partnership Project; Technical Specification Group Radio Access Network; User Equipment (UE) radio transmission and reception (FDD)), Section 6.8.1.

FIG. 2 shows the shape of a filter function for a roll-off factor $\alpha=0$, corresponding to the perpendicular rise of the function at the subband boundaries, and also for a roll-off factor $\alpha>0$, corresponding to the flattened rise. This diagram shows that when a roll-off factor $\alpha>0$ is used for the subband SB2, signal transmission in the adjacent subbands SB1 and SB3 is affected, for the portion of the spectrum intended for subband SB2 has spread into the region of the subbands SB1 and SB3. Therefore, part of the signal of the subband SB2 is transmitted on the subbands SB1 and SB3. If signals are transmitted simultaneously on adjacent subbands, a roll-off factor $\alpha>0$ being used for each or at least for one of the two adjacent subbands, undesirable adjacent channel interference occurs.

As already mentioned, using filters has the advantage of reducing the PAPR. The disadvantage, however, is that by using the filter as explained with reference to FIG. 2, the spectral efficiency is reduced, i.e. to achieve a particular transmission rate, more of the frequency spectrum is required when using a filter that without filtering. The problem caused by spectral spreading is that the broader spectrum causes interference to the signal of a transmitter which is transmitting in the adjacent subband. According to the matched filter approach, the optimum filter on the receiver side is widened like the transmit filter, so that a superposition of signals of different transmitters is present at the receiver.

The filter bandwidth and therefore in particular the roll-off factor $\alpha$ is matched to the adjacent channel loading. Thus, using narrow filtering, i.e. a roll-off factor $\alpha \approx 0$ is suitable for the case that the adjacent subbands are occupied. If, on the other hand, the adjacent subbands are vacant, i.e. not being used for signal transmission, it is advantageous to use a greater roll-off factor, as this enables the PAPR to be reduced without any disadvantageous effect in terms of adjacent channel interference.

The user station UE is allocated, say, the subband SB2 for transmitting signals to the base station NodeB. Alternatively, the user station UE may be allocated a plurality of subbands, sometimes called a "chunk". For example, a chunk can include a block of three contiguous subbands. In general, using chunks means that a chunk is the smallest unit of radio resources that can be allocated to a user station. Therefore, if a chunk is allocated instead of an individual subband SB2, the frequency portions shown in FIG. 2 as individual subbands SB1 and SB3 are preferably also chunks. The following comments concerning the allocation of the individual subband SB2 also apply accordingly to the allocation of a chunk. In both cases, i.e. allocation of an individual subband or allocation of a plurality of adjacent subbands, the filter characteristics are matched to the subband boundaries between a subband occupied by the user station UE and a subband occupied by another user station.

The filter characteristics which the user station UE uses to process the signals to be transmitted are selected according to whether the subbands SB1 and SB3 are occupied, i.e. whether they are currently allocated to other user stations for signal transmission. If the subbands SB1 and SB3 are free, i.e. not occupied, spectral spreading into the regions of the subbands SB1 and SB3 is implemented for the subband SB2 by using a roll-off factor α>0. This improves transmission particularly in the situation in which the user station UE finds itself at its output power limit.

If, on the other hand, the adjacent subbands SB1 and SB3 are currently occupied, a compromise must be found between the PAPR of the user station UE and the interference caused by spectral spreading. Therefore, in the case of occupied adjacent subbands, a lower value for the roll-off factor α is used than for unoccupied adjacent subbands. As a result, although the PAPR is increased compared to the unoccupied adjacent subbands, this reduces the interference between the signals of the subband SB2 and the subbands SB1 and SB3. In this way a type of transmission matched to the current situation can be selected.

If the subband SB1 is occupied, while the subband SB3 is vacant, the roll-off factor α for the two subband boundaries can be set differently: for the boundary between the subbands SB1 and SB2, a lower value of the roll-off factor α is selected and for the boundary between the subbands SB2 and SB3 a larger value. In this case of individual adjustment of the spectral spreading at the upper and lower frequency boundary, there is produced—in contrast to the symmetrical shape in FIG. 2—an asymmetrical shape of the filter curve.

The user station UE can use an assignment table to decide about the filtering to be used. For example, as a general rule: α=0.14 if the relevant adjacent subband is not occupied and α=0.07 in the case of occupancy of the relevant adjacent subband. If this assignment table is known to the base station NodeB, a matched filter used by the base station NodeB can be optimally adjusted.

In order to ascertain whether the adjacent subbands are occupied, the user station UE observes the radio resource allocations transmitted by the base station NodeB. For this purpose the base station NodeB sends this scheduling information in such a way that not only the user station directly affected by the allocation, but at least also the user stations to which adjacent subbands are allocated can receive and evaluate the scheduling information.

For example, the channel allocations of all the user stations can be jointly coded by the base station NodeB so that, after decoding to determine its own radio resource allocation, all the channel allocations are known to each user station. Coding of the channel allocations not only for an individual user station but jointly for a plurality of user stations is also advantageous in that the thereby increased quantity of bits to be coded enables more efficient coding methods such as turbo coding, for example, to be used.

However, it is not necessary for all the user stations to be informed about all the radio resource allocations of other user stations; only the adjacent subbands are relevant for selecting the spectral spreading to be applied. It therefore suffices for some of the channel allocations to be jointly coded. For this purpose, user stations to which adjacent subbands are allocated can be combined into groups, the scheduling information being jointly coded for each individual group.

It is also possible for the base station NodeB to explicitly signal to the user station UE whether the subbands SB1 and SB3 adjacent to its subband SB2 are occupied or vacant. This explicit signaling can be sent to the user station UE e.g. together with the allocation of the subband SB2. Using explicit signaling obviates the need for the user station UE to evaluate the channel allocations of other user stations.

A combination of the two proposed methods of informing the user station UE about the occupancy of the adjacent subbands is also possible. For example, user station UE can infer from the channel allocations of other user stations that the subband SB1 is occupied, while the base station NodeB explicitly notifies the user station UE that the subband SB3 is vacant. This efficient method of providing information about the occupancy of adjacent subbands only involves slight additional signaling complexity which is necessary for deciding which filter characteristics are to be used.

The procedure has been described whereby the user station UE is informed by the base station NodeB about the occupancy of the adjacent subbands SB1 and SB3 either implicitly by the channel allocations to other user stations or explicitly by a message specifically intended for the user station UE. From the knowledge of the adjacent channel occupancy, the user station UE then determines the filter characteristics to be used, an assignment rule known to the base station NodeB preferably being used. Alternatively, the base station NodeB can inform the user station UE directly about the filter characteristics to be used, e.g. together with the allocation of the subband SB2 to the user station UE. The base station NodeB can make an efficient decision as to the spectral spreading to be applied by the various user stations, as the resource allocation and therefore occupancy is known to the base station NodeB as part of managing its radio resources.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method for communication by radio, comprising:
    subdividing a frequency band into a plurality of subbands;
    allocating a first subband to a first user station for transmitting signals with a base station;
    receiving scheduling information at the first user station from the base station concerning the frequency allocated to a second user station; and
    filtering signals at the first user station prior to transmitting the signals from the first user station using at least the first subband, the first user station filtering using a filter function having a parameter that depends on whether a second subband is allocated to the second user station, the second subband being directly adjacent to the first subband the first user station transmitting the signals using at least the first subband after filtering, wherein
    the first user station filters such that the first user station itself modifies and adapts the frequency allocation of the first subband depending on the second user station's second subband allocation.

2. The method as claimed in claim 1, wherein
    the parameter determines a frequency domain filter bandwidth.

3. The method as claimed in claim 2, wherein
    if the second subband is occupied, a smaller frequency domain filter bandwidth is used than if the second subband is unoccupied.

4. The method as claimed in claim 2, wherein
if the second subband is occupied, the frequency domain filter bandwidth is determined by the parameter such that the signals are transmitted without using a part of the second subband.

5. The method as claimed in claim 2, wherein
if the second subband is unoccupied, the frequency domain filter bandwidth is determined by the parameter such that the signals are transmitted using a part of the second subband.

6. The method as claimed in claim 1, wherein
the information relating to the allocation of the second subband is jointly coded with information relating to an allocation of the first subband to the user station.

7. The method as claimed in claim 1, wherein
because the parameter depends on the allocation of the second subband, the filter function has a shape at a first frequency edge of the first subband that differs from a shape of the filter function at a second frequency edge of the first subband.

8. The method as claimed in claim 1, wherein
varying the parameter results in a variation in a ratio of a peak output power of the first user station to an average output power of the first user station.

9. The method as claimed in claim 1, wherein
a plurality of first subbands are allocated to the first user station for communication with the base station, the plurality of first subbands being adjacent in the frequency domain, and
the second subband is directly adjacent to one of the first subbands allocated to the first user station.

10. The method as claimed in claim 1, wherein
the filter is a root raised cosine filter.

11. The method as claimed in claim 3, wherein
if the second subband is occupied, the frequency domain filter bandwidth is determined by the parameter such that the signals are transmitted without using a part of the second subband.

12. The method as claimed in claim 11, wherein
if the second subband is unoccupied, the frequency domain filter bandwidth is determined by the parameter such that the signals are transmitted using a part of the second subband.

13. The method as claimed in claim 6, wherein
because the parameter depends on the allocation of the second subband, the filter function has a shape at a first frequency edge of the first subband that differs from a shape of the filter function at a second frequency edge of the first subband.

14. The method as claimed in claim 13, wherein
varying the parameter results in a variation in a ratio of a peak output power of the first user station to an average output power of the first user station.

15. The method as claimed in claim 14, wherein
a plurality of first subbands are allocated to the first user station for communication with the base station, the plurality of first subbands being adjacent in the frequency domain, and
the second subband is directly adjacent to one of the first subbands allocated to the first user station.

16. The method as claimed in claim 15, wherein
the filter is a root raised cosine filter.

17. A first user station for communication by radio using a frequency band subdivided into a plurality of subbands, the first user station comprising:
a receiver to receive scheduling information from a base station concerning an allocation of a first subband to the first user station and concerning the frequency allocated to a second user station;
a controller to select the first subband for transmitting signals from the first user station;
a filter to filter prior to transmission of the signals, the filter having a filter function controlled by a parameter that depends on whether a second subband is allocated to the second user station, the second subband being directly adjacent to the first subband; and
a transmitter to transmit signals on at least the first subband after filtering, wherein
the first user station filters such that the first user station itself modifies and adapts the frequency allocation of the first subband depending on the second user station's second subband allocation.

18. A base station for communication by radio using a frequency band subdivided into a plurality of subbands, comprising:
a transmitter to transmit scheduling information to a first user station concerning an allocation of a first subband to the first user station and concerning the frequency allocated to a second user station, wherein
the information is transmitted to the first user station to cause the first user station to filter signals at the first user station prior to transmitting the signals from the first user station using at least the first subband, the first user station filtering using a filter function having a parameter that depends on whether a second subband is allocated to the second user station, the second subband being directly adjacent to the first subband, the first user station transmitting the signals using at least the first subband after filtering, and
the first user station filters such that the first user station itself modifies and adapts the frequency allocation of the first subband depending on the second user station's second subband allocation.

* * * * *